US012306655B2

(12) United States Patent
Eckhardt

(10) Patent No.: US 12,306,655 B2
(45) Date of Patent: May 20, 2025

(54) CURVATURE COMPENSATION CIRCUITS FOR BANDGAP VOLTAGE REFERENCE CIRCUITS

(71) Applicant: GlobalFoundries U.S. Inc., Malta, NY (US)

(72) Inventor: Uwe Eckhardt, Dresden (DE)

(73) Assignee: GLOBALFOUNDRIES U.S. INC., Malta, NY (US)

( * ) Notice: Subject to any disclaimer, the term of this patent is extended or adjusted under 35 U.S.C. 154(b) by 231 days.

(21) Appl. No.: 18/097,175

(22) Filed: Jan. 13, 2023

(65) Prior Publication Data

US 2024/0241535 A1 Jul. 18, 2024

(51) Int. Cl.
*G05F 3/30* (2006.01)

(52) U.S. Cl.
CPC .................................... *G05F 3/30* (2013.01)

(58) Field of Classification Search
CPC .................................. G05F 3/30; G05F 3/242
See application file for complete search history.

(56) References Cited

U.S. PATENT DOCUMENTS 6,828,847 B1 12/2004 Marinca
6,891,358 B2 5/2005 Marinca
8,106,707 B2 * 1/2012 Katyal ...................... G05F 3/30 327/539
8,228,052 B2 * 7/2012 Marinca .................... G05F 3/30 327/542
10,198,022 B1 2/2019 Far
10,359,801 B1 7/2019 Chen et al.
11,099,594 B1 8/2021 Kanoun
2009/0251203 A1 10/2009 Kimura
2013/0328615 A1 * 12/2013 Sano ......................... G05F 3/30 327/513

FOREIGN PATENT DOCUMENTS

CN 112148429 12/2020
JP 2009251877 10/2009

OTHER PUBLICATIONS

European Search Report and Opinion dated May 27, 2024 in European Application No. 23214852.8-1009, 14 pages.
Prajith Kumar Poongodan et al., "A Low Power, Offset Compensated, CMOS Only Bandgap Reference in 22 nm FD-SOI Technology" 2018 7th International Conference on Modern Circuits and Systems Technologies (MOCAST), Thessaloniki, Greece, doi: 10.1109/MOCAST.2018.8376639, 2018, 4 pages.

(Continued)

*Primary Examiner* — Adolf D Berhane
*Assistant Examiner* — Afework S Demisse
(74) *Attorney, Agent, or Firm* — David Cain; Andrew M. Calderon; Calderon Safran & Wright P.C.

(57) ABSTRACT

The present disclosure relates to a structure including a first curvature compensation circuit which includes a first set of transistors, and a second curvature compensation circuit which includes a second set of transistors. A voltage reference (VREF) signal output from a bandgap voltage reference core with the second curvature compensation circuit is received as an input to the first curvature compensation circuit.

19 Claims, 7 Drawing Sheets

(56) References Cited

OTHER PUBLICATIONS

Gabriel A. Rincon-Mora et al., "A 1.1-V Current-Mode and Piecewise-Linear Curvature-Corrected Bandgap Reference", in IEEE Journal of Solid-State Circuits, vol. 33, No. 10, pp. 1551-1554, doi: 10.1109/4.720402, Oct. 1998, 4 pages.
Jie Shen et al., "A Curvature Compensation Technique for Low-Voltage Bandgap Reference", Energies 2021, 14, 7193. https://doi.org/10.3390/en14217193, 12 pages.
Made Gunawan et al., "A Curvature-Corrected Low-Voltage Bandgap Reference", in IEEE Journal of Solid-State Circuits, vol. 28, No. 6, pp. 667-670, doi: 10.1109/4.217981, Jun. 1993, 4 pages.
Stefan Marinca et al., "Curvature Correction Method for a Bandgap Voltage Reference", IET Irish Signals and Systems Conference (ISSC 2008), Galway, 2008, pp. 134-137, doi: 10.1049/cp:20080651, 4 pages.
Gerard C. M. Meijer et al., "A New Curvature-Corrected Bandgap Reference", in IEEE Journal of Solid-State Circuits, vol. 17, No. 6, pp. 1139-1143, doi: 10.1109/JSSC.1982.1051872, Dec. 1982, 5 pages.
Piero Malcovati et al., "Curvature-Compensated BiCMOS Bandgap with 1-V Supply Voltage", in IEEE Journal of Solid- State Circuits, vol. 36, No. 7, pp. 1076-1081, doi: 10.1109/4.933463, Jul. 2001, 6 pages.
Ming-Dou Ker et al., "New curvature-compensation technique for CMOS bandgap reference with sub-1-V operation," 2005 IEEE International Symposium on Circuits and Systems (ISCAS), Kobe, Japan, 2005, pp. 3861-3864 vol. 4, doi: 10.1109/ISCAS.2005.1465473, Abstract, 2 pages.
Foreign Office Action in TW Application No. 112148429 dated Oct. 4, 2024, 5 pages.
Foreign Search Report in TW Application No. 112148429 dated Sep. 16, 2014, 2 pages.
Foreign Reference Search in TW Application No. 112148429 dated Oct. 4, 2024, 1 page.

* cited by examiner

CURVATURE COMPENSATION CIRCUITS FOR BANDGAP VOLTAGE REFERENCE CIRCUITS

BACKGROUND

The present disclosure relates to curvature compensation circuits in bandgap voltage reference circuits and, more particularly, to curvature compensation circuits utilizing sub-threshold operation and back gate biasing and methods of operation.

A fully depleted silicon on insulator (FDSOI) bandgap voltage reference circuit with a low supply voltage and low power consumption and low temperature limit are needed in several application areas (e.g., Internet of Things (IOT)). Bipolar junction transistor (BJT) diodes based bandgap voltage reference circuits cannot be deployed in these application areas at low supply voltages (e.g., less than 0.8 volts) due to a high emitter voltage at low temperatures. In particular, bandgap voltage references need compensation of second order temperature dependencies to achieve low temperature coefficients.

SUMMARY

In an aspect of the disclosure, a structure comprises: a first curvature compensation circuit which comprises a first set of transistors, and a second curvature compensation circuit which comprises a second set of transistors. A voltage reference (VREF) signal output from a bandgap voltage reference core with the second compensation circuit is received as an input to the first curvature compensation circuit.

In an aspect of the disclosure, a circuit comprises: a first set of transistors which operate in a sub-threshold region and which are connected to a voltage reference (VREF) signal, a second set of transistors which operate in the sub-threshold region and which are connected to the VREF signal that is output from the second set of transistors, a selector which selects a number of active FDSOI transistors from the first set of transistors; and a tapped resistor which selects a portion of the VREF signal fed back to a back gate of the first set of transistors and the second set of transistors of curvature compensation circuits.

In an aspect of the disclosure, a method comprises: generating a temperature dependent current in a first curvature compensation circuit, and injecting the temperature dependent current to a second curvature compensation circuit to compensate a current increase with temperature in a plurality of transistors in the second curvature compensation circuit. The plurality of transistors operate in a sub-threshold region.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

The present disclosure relates to curvature compensation circuits of bandgap voltage reference circuits and, more particularly, to curvature compensation circuits utilizing sub-threshold operation and back gate biasing and methods of operation. In the present disclosure, the curvature compensation circuits for bandgap voltage reference circuits operate in a sub-threshold region. The curvature compensation circuits are functional for a bandgap voltage reference circuit with low supply voltage (e.g., 0.8 volts and below), low power requirements (e.g., less than 3.2 μW), and for a temperature range from about −40° ° C. to about 150° C. and above. In more specific embodiments, the curvature compensated bandgap voltage reference circuit has a low temperature coefficient of approximately 2 PPM/° C. Moreover, the curvature compensation circuits use back gate biasing on fully depleted silicon-on-insulator (FDSOI) field effect transistors (FETs) operating in the sub-threshold region for compensation of second order temperature effects. Accordingly, the compensation circuits provide a curvature compensated fully depleted silicon-on-insulator (FDSOI) bandgap with a low temperature coefficient (TC) at a low supply voltage VDD and low power consumption in comparison to known circuits.

Figure 1:
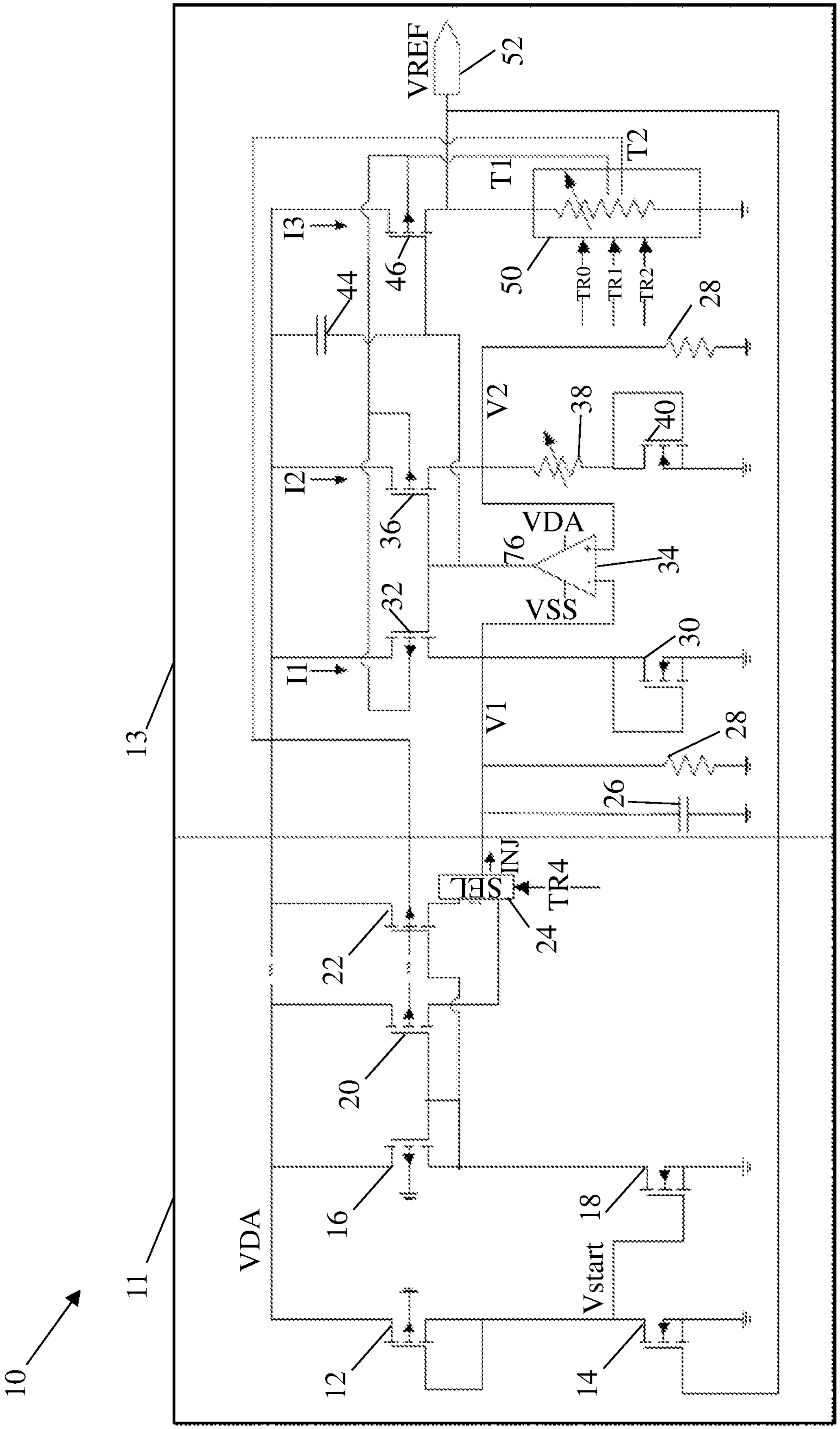
FIG. 1 shows a bandgap voltage reference circuit with curvature compensation circuits in accordance with aspects of the present disclosure.

FIG. 1 shows a bandgap voltage reference circuit with curvature compensation circuit in accordance with aspects of the present disclosure. In FIG. 1, a circuit 10 includes a first curvature compensation circuit 11 (e.g., first startup and curvature compensation circuit) and a bandgap voltage reference core with a second curvature compensation circuit 13 (e.g., second curvature compensation circuit). The first curvature compensation circuit 11 includes transistors 12, 14, 16, 18, 20, and 22, selector 24, first power supply voltage VDA, second power supply voltage VSS (i.e., ground 53), and current INJ. The transistors 12, 16, 20, and 22 may be p-type metal-oxide-semiconductor (PMOS) FDSOI transistors, while the transistors 14 and 18 may be n-type metal-oxide-semiconductor (NMOS) FDSOI transistors; although embodiments are not limited and may also be other types of FDSOI transistors, e.g., flip-well.

The bandgap voltage reference core with second curvature compensation circuit 13 includes capacitors 26, 44, resistors 28, 38, and 50, transistors 30, 32, 36, 40, 46, operational amplifier 34, voltage reference (VREF) output 52, currents I1, I2, and I3, voltages V1, V2, first supply voltage VDA, and second power supply voltage VSS (i.e., ground 53). The transistors 32, 36, and 46 may be PMOS FDSOI transistors, while the transistors 30 and 40 may be NMOS FDSOI transistors; although embodiments are not limited to these particular implementations and may also be other types of FDSOI transistors. The second curvature compensation is realized by the back gate voltage of transistors 32, 36, and 46 tapped at a tapped resistor 50.

In FIG. 1, the transistors 12, 16, 20, and 22 of the first curvature compensation circuit 11 each have a source which receives the first supply voltage VDA. Transistors 12 and 16 each have a drain connected to their respective gates. Transistors 20 and 22 each have a drain connected to the selector 24. In embodiments, the transistor 20 may be a first transistor (e.g., the first transistor) of a set of transistors N up to the transistor 22 (e.g., the Nth transistor), wherein N is an integer value greater than one. In this embodiment, the set of transistors N (i.e., transistor 20, . . . transistor 22) have gates connected to each other.

The transistor 14 has a drain connected to a voltage start signal Vstart, a source connected to the ground 53 (i.e., the second power supply voltage VSS), and a back gate connected to the voltage reference (VREF) output 52 (i.e., a negative feedback loop). The selector 24 receives the drain current of N transistors (i.e., transistor 20, . . . , transistor 22) and outputs a preset subset of the N drain currents to a selector output signal with a current INJ flowing to the second curvature compensation circuit 13.

In operation, the transistors 16, 20, and 22 of the first curvature compensation circuit 11 are in ohmic or saturation mode during a start-up phase and in a sub-threshold mode during a curvature compensation phase. Further, the current INJ flowing to the second curvature compensation circuit 13, during the compensation, may cause the voltage V1 to be feedback trimmed based on a preset number P from the set of N transistors between the transistor 20 (e.g., the first transistor) and the transistor 22 (e.g., the Nth transistor) and a back gate voltage tapped at a tapped resistor 50. The preset number P results from a trim procedure. Further, the voltage reference (VREF) output 52 has a negative feedback which is looped to the back gate of the transistor 14.

In FIG. 1, the transistors 32, 36, and 46 of the bandgap voltage reference core with second curvature compensation circuit 13 each have a source which receives the first supply voltage VDA. Further, the transistors 32, 36, and 46 have corresponding currents I1, I2, and I3 flowing through their respective sources (i.e., current I1 flows through the source of the transistor 32, current I2 flows through the source of the transistor 36, and current I3 flows through the source of the transistor 46). Transistor 32 has a drain connected to a drain of transistor 30, transistor 36 has a drain which is connected to the resistor 38, and transistor 46 has a drain which is connected to the tapped resistor 50 and the voltage reference (VREF) output 52. Transistors 30 and 40 each have a source which is connected to the ground 53 (i.e., the second power supply voltage VSS). Transistor 40 has a drain which is also connected to the resistor 38.

In FIG. 1, the tapped resistor 50 of the second curvature compensation circuit 13 is connected to the ground 53 and is connected to the back gates of transistors 32, 36, and 46. Resistor 28 is on both sides of the operational amplifier 34 and is connected to the voltages V1 and V2. Capacitor 44 is between the first supply voltage VDA and the operational amplifier 34. The capacitor 26 is between the voltage V1 and the ground 53. The operational amplifier 34 receives the voltage V1 at a negative terminal and the voltage V2 at a positive terminal. The operational amplifier 34 also receives the first power supply voltage VDA and the second power supply voltage VSS and outputs an operational amplifier output signal 76 (see also FIG. 2).

In operation of FIG. 1, the transistors 30 and 40 operate in the sub-threshold mode to reduce a maximum voltage value of voltages V1, V2. Further, the transistors 30 and 40 have superior matching near a sub-threshold mode. Also, the transistors 30 and 40 operating in the sub-threshold mode may have sub-threshold transistor carrier transport with diffusion, instead of drift, to compensate for the rising temperature. In an embodiment, the transistor 40 has a width/length (W/L) ratio which is greater than the W/L ratio of the transistor 30.

Transistors 32, 36, and 46 in the sub-threshold mode have a current increase with increasing temperatures, which is equivalent to a threshold voltage decrease. Further, an increase in the back gate voltage of an FDSOI PMOS transistor (e.g., transistors 32, 36, and 46) results in a threshold voltage increase. Feeding back with a temperature increasing voltage reference (VREF) output 52 to PMOS back gates compensates the temperature dependent threshold voltage change and stabilizes the voltage reference (VREF) output 52 in the second curvature compensation circuit 13. VREF curvature is trimmed by selecting an appropriate tap on signal T1 of the tapped resistor 50 with trim vector TR1 depending on the present process corner and device mismatch.

Figure 2:
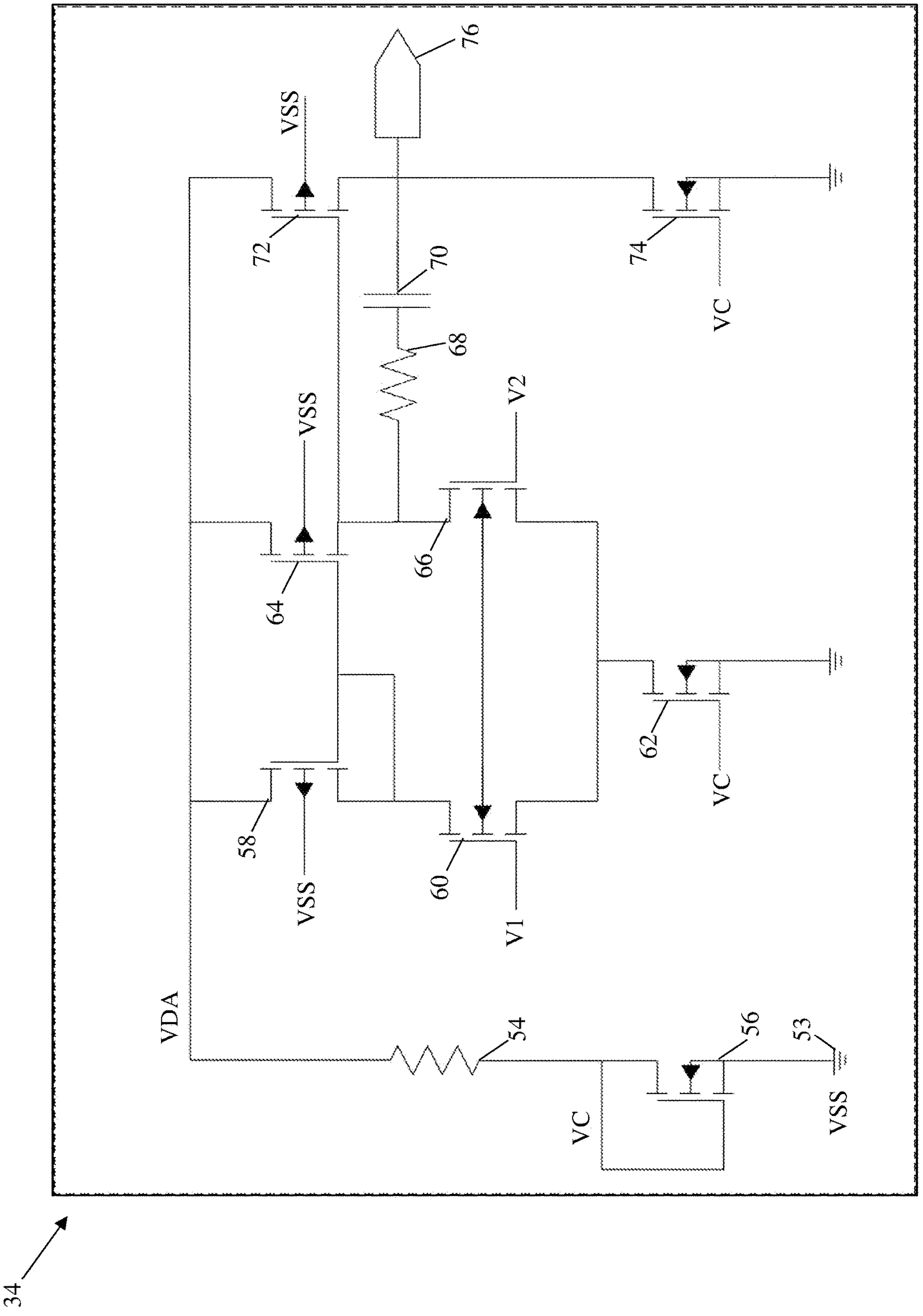
FIG. 2 shows an operational amplifier of the curvature compensation circuits of FIG. 1 in accordance with aspects of the present disclosure.

FIG. 2 shows an operational amplifier of the curvature compensation circuit of FIG. 1. In FIG. 2, the operational amplifier 34 of the bandgap voltage reference core with the second curvature compensation circuit 13 includes resistors 54, 68, transistors 56, 58, 60, 62, 64, 66, 72, 74, capacitor 70, the operational amplifier output signal 76, the first power supply voltage VDA, the second power supply voltage VSS, voltage VC, and the ground 53 (i.e., the second power supply voltage VSS). The transistors 58, 64, and 72 may be PMOS FDSOI transistors, while the transistors 56, 60, 62, 66, and 74 may be NMOS FDSOI transistors; although embodiments are not limited to this particular implementation.

In FIG. 2, the transistors 58, 64, and 72 of the operational amplifier 34 each have a source which receives the first supply voltage VDA. A drain of transistor 58 is connected to a drain of transistor 60, a drain of transistor 64 is connected to a drain of transistor 66, and a drain of transistor 72 is connected to a drain of transistor 74. Further, each source of transistors 60 and 66 are connected to a drain of transistor 62 and a back gate of transistor 60 is connected to a back gate of transistor 66. In addition, each source of transistors 62 and 74 are connected to the ground 53. A drain of transistor 56 is connected to the resistor 54 and a source of transistor 56 is connected to the ground 53. The resistor 54 is between the first power supply voltage VDA and the transistor 56 and the resistor 68 is between the capacitor 70 and a drain of transistor 64. The capacitor 70 is between the resistor 68 and the operational amplifier output signal 76.

In operation, the transistors 60 and 66 may operate in the sub-threshold mode with a lower threshold voltage (i.e., Vt) than the transistors 30 and 40 in the second curvature compensation circuit 13. The Vgb of transistors 30 and 40 (i.e., voltage from gate to back gate of transistors 30 and 40) are lower than the Vgb of transistors 60 and 66 (i.e., voltage from gate to back gate of transistors 60 and 66). In this scenario, the threshold voltage (i.e., Vt) of the transistors 30 and 40 are higher than the threshold voltage (i.e., Vt) of the transistors 60 and 66. The back gates of the transistors 60 and 66 are connected to the first supply voltage VDA. Further, the operational amplifier 34 may be configured to have a high transconductance gm over dc drain current ratio (e.g., Gm/Id) in the sub-threshold mode.

Figure 3:
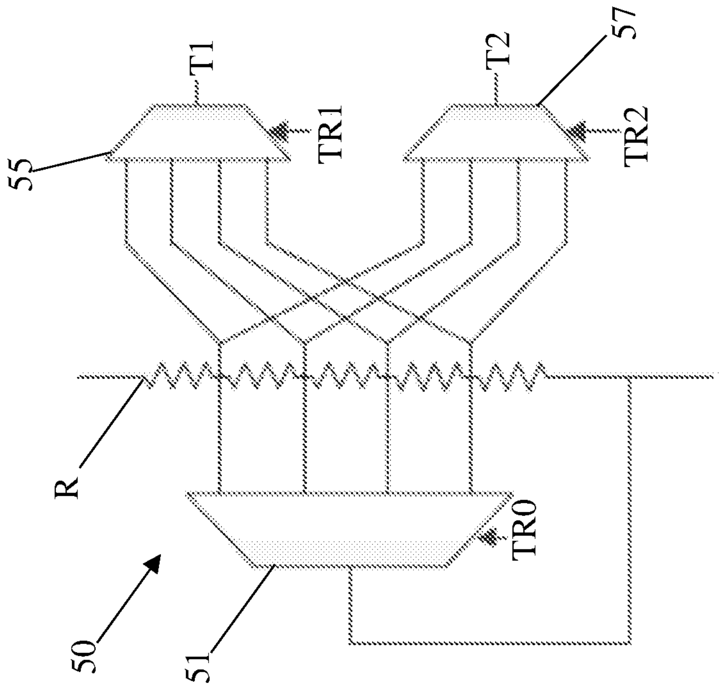
FIG. 3 shows a tapped resistor of the curvature compensation circuits of FIG. 1 in accordance with aspects of the present disclosure.

FIG. 3 shows a tapped resistor of the curvature compensation circuits of FIG. 1. In particular, the tapped resistor 50 comprises a plurality of R resistors, in which R represents an integer number of resistors. Further, first selector 51 of the tapped resistor 50 receives a first input vector TR0, and connects one of the nodes in between the R resistors to the ground connected node on the bottom to set the resistance. Further, the second selector 55 and third selector 57 receive a second input vector TR1 and a third input vector TR2. The second selector 55 connects one of the nodes in between the R resistors to signal T1. The selected node is determined by the second input vector TR1. The third selector 55 connects one of the nodes in between the resistors to signal T2. The selected node is determined by the third input vector TR2. The first, second, and third input vectors TR0, TR1, and TR2 are determined by an initial trim process.

Figure 4:
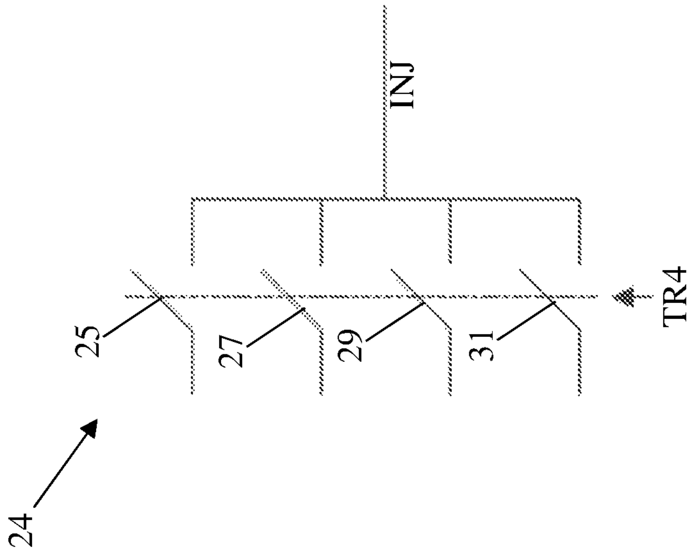
FIG. 4 shows a selector of the curvature compensation circuits of FIG. 1 in accordance with aspects of the present disclosure.

FIG. 4 shows a selector of the curvature compensation circuit of FIG. 1. In particular, the selector 24 receives the drain current of N transistors (i.e., transistor 20, . . . , transistor 22). Further, the selector 24 comprises a plurality of switches 25, 27, 29, and 31 for outputting a preset subset of the N drain currents to a selector output signal with the current INJ flowing to the second curvature compensation circuit 13. The selector 24 also receives a fourth input vector TR4 for setting the plurality of switches 25, 27, 29, and 31. The fourth input vector TR4 is also determined by the initial trim process.

Figure 5A:
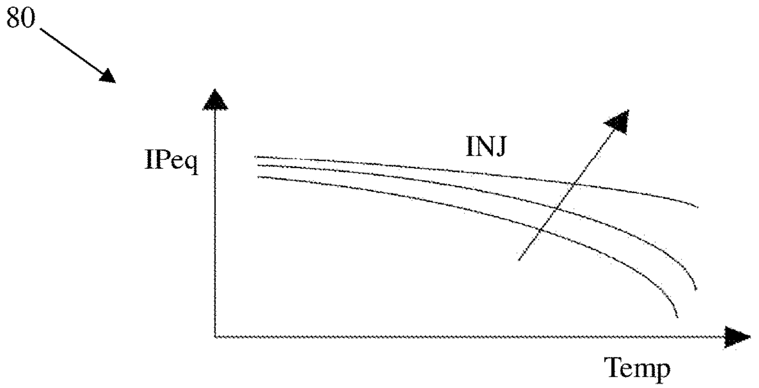
FIG. 5A shows a graph corresponding to the curvature compensation circuits of FIG. 1 in accordance with aspects of the present disclosure.
Figure 5B:
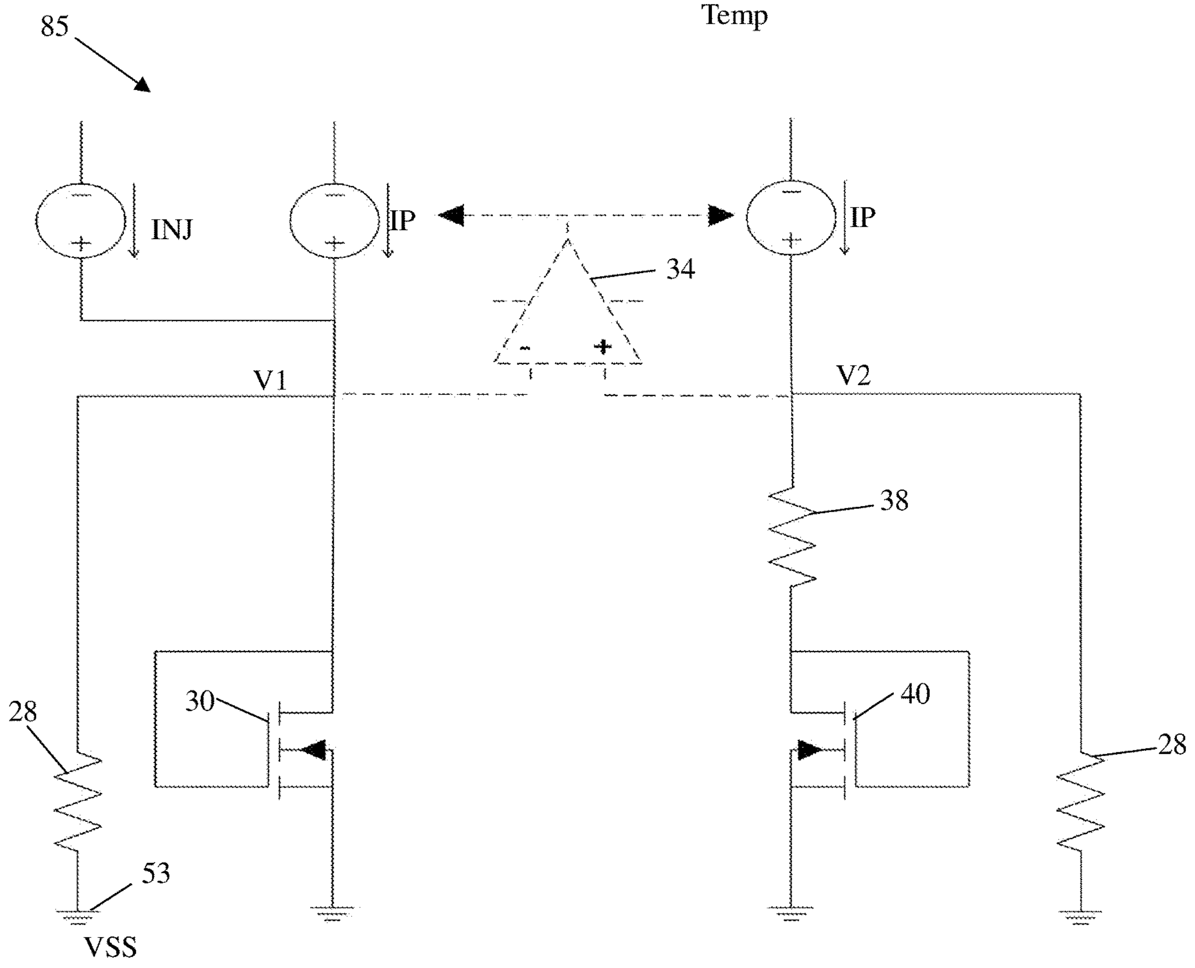
FIG. 5B shows a circuit schematic corresponding to the curvature compensation circuits of FIG. 1 in accordance with aspects of the present disclosure.

FIGS. 5A and 5B show a graph and a circuit schematic, respectively, corresponding to the curvature compensation circuit of FIG. 1. In FIG. 5A, graph 80 shows the relationship between a current source equivalent IPeq on the y-axis and temperature on the x-axis. In FIG. 5A, the current source equivalent IPeq is equal to a current source IP shown n FIG. 5B if V1=V2. Injected current INJ increases non-linearly with temperature. Further, the graph 80 shows that the current source equivalent IPeq drops non-linearly as temperature is raised. Temperature dependent non-linearity of the injected current INJ compensates non-linearity of IPeq. The current INJ is adjusted by i) a number of PMOS stages N in the first curvature compensation circuit 11 and ii) by the back gate voltage feedback from the tapped resistor 50.

In FIG. 5B, the circuit schematic 85 shows the operational amplifier 34 as a dotted line to indicate that the voltage controlled current source 33 and 36 (see FIG. 1) conduct identical currents denoted with IP. IPeq is the current value of IP which satisfies equivalence V1=V2 of voltages V1 and V2.)

In FIG. 5B, the voltage controlled current sources 20 and 22 (see FIG. 1) are represented by the current source conducting current INJ. The current INJ is injected into a node of voltage V1. The current INJ increases non-linearly with temperature due to the temperature current relation of transistors 20 and 22 in a sub-threshold mode. The injected current INJ is adjusted by i) a number of PMOS states N in the first curvature compensation circuit 11 and ii) by the back gate voltage feedback from the tapped resistor 50.

Figure 6:
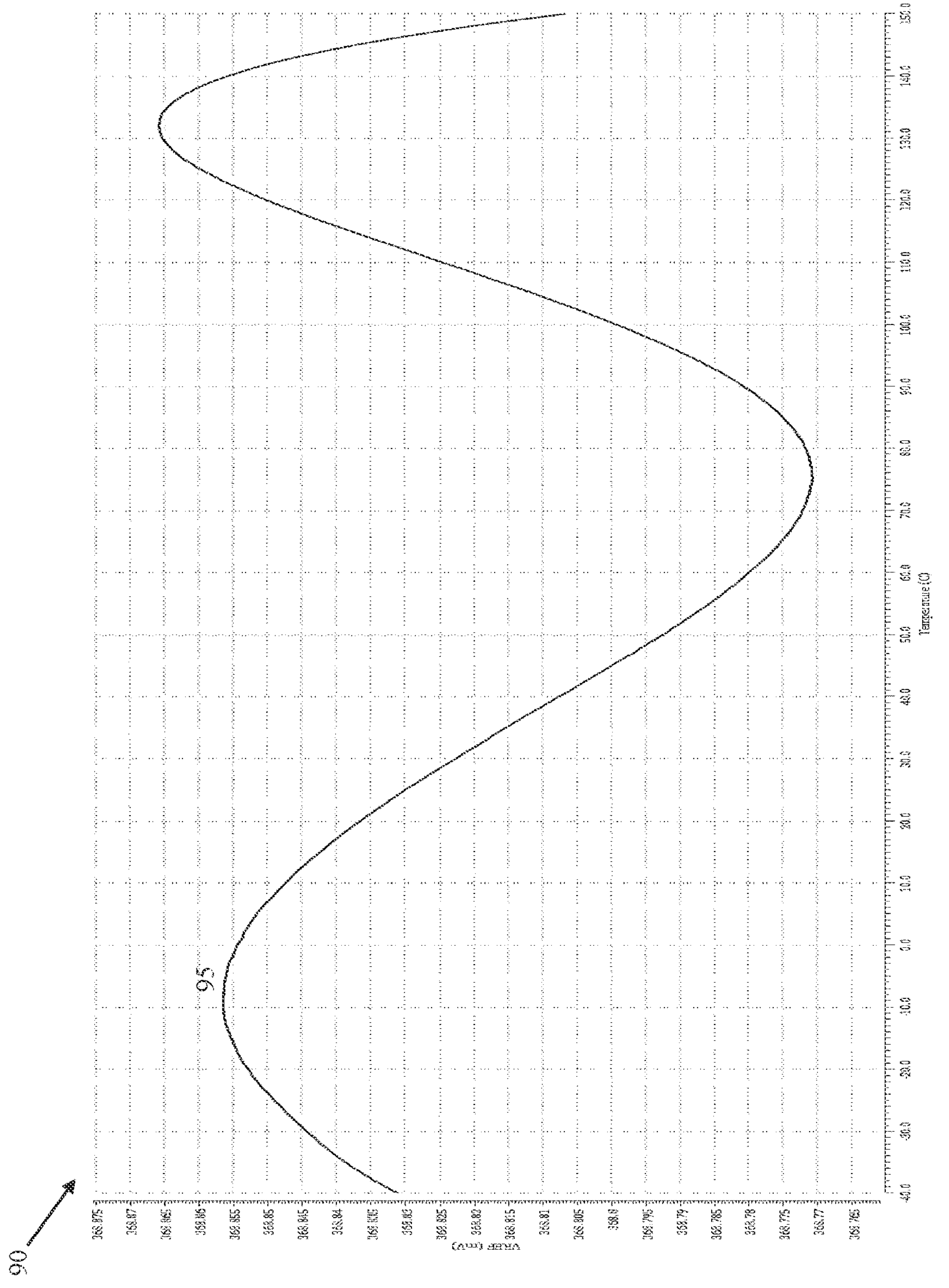
FIGS. 6 and 7 show graphs of the bandgap voltage reference circuit with curvature compensation circuits of FIG. 1 in accordance with additional aspects of the present disclosure.
Figure 7:
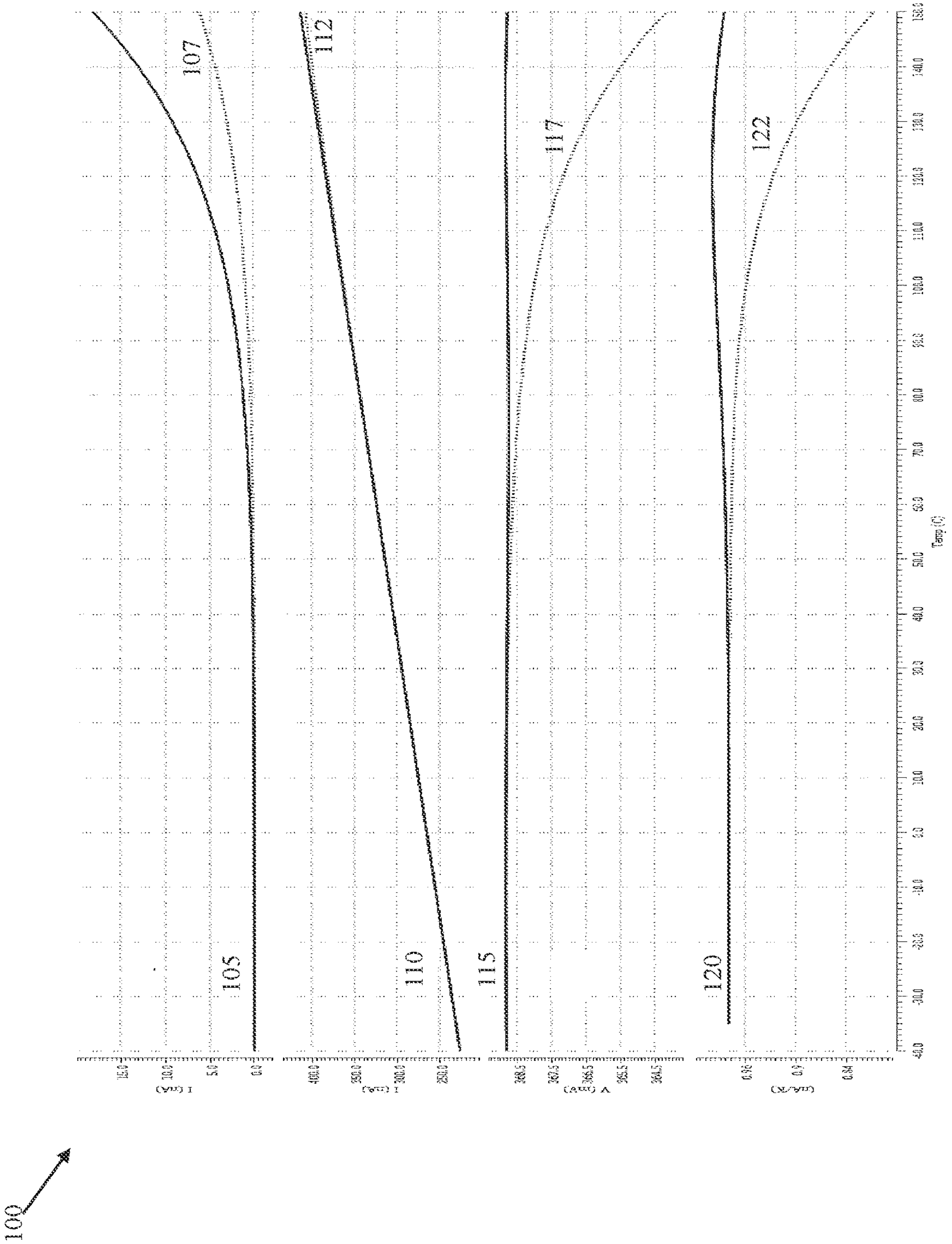

FIGS. 6 and 7 show graphs of the curvature compensated bandgap voltage reference circuit of FIG. 1. In FIG. 6, the graph 90 shows the voltage reference (VREF) output line 95 plotted against the voltage (in volts) on the y-axis and the temperature (in Celsius) on the x-axis. In FIG. 6, the VREF output line 95 has a voltage variation of approximately 129 μV, which is equivalent to a low temperature coefficient TC of approximately 2 PPM/° C. at 0.8 V supply voltage, a power consumption of 3.2 μW due to the sub-threshold operation, and a temperature range from about −40° C. to about 150° C.

FIG. 7 shows graphs 100 which includes current INJ lines 105 and 107 plotted against current (in nA) on the y-axis and the temperature (in Celsius) on the x-axis. In particular, the current INJ lines 105 and 107 show current increases as temperature rises. The difference between current INJ lines 105 and 107 results from the difference in back gate biasing of the transistors 20 and 22. The back gate bias voltage is tapped from the tapped resistor 50. The tapping point of the back gate voltage is set with an integer trim vector. The optimal setting of the tapping point has to be determined in a trim process. In FIG. 7, the graphs 100 also include the current source IP in lines 110 and 112.

In FIG. 7, the voltage reference (VREF) output line 115 is plotted against the voltage (in mV) on the y-axis and the temperature (in Celsius) on the x-axis. In particular, the VREF output line 115 shows that the voltage variation is curvature compensated by the two new compensation circuits as temperature rises (compare to a known circuit without curvature compensation shown as a dotted line 117). In other words, the VREF output line 115 shows that the output voltage is able to be maintained at a fairly stable voltage level even as temperature increases due to curvature compensation.

FIG. 7 also shows a line of second order effects of a ratio between the current IP and a temperature. In particular, FIG. 7 shows the derivative of the current IP with respect to the temperature in lines 120 and 122. Lines 120 and 122 are plotted against the current/temperature (in nA/K) on the y-axis and the temperature (in Celsius) on the x-axis). In particular, the dIP/dTemp line 120 is relatively stable as the temperature increases, which occurs in the curvature compensation in the present disclosure in comparison to known circuits in which the dIP/dTemp line drops steadily as the temperature increases (i.e., the known circuit is shown as a dotted line 122).

The bandgap voltage reference circuit with compensation circuits may be manufactured in FDSOI technology in several ways using a number of different tools. In general, though, the methodologies and tools may be used to form structures with dimensions in the micrometer and nanometer scale. The methodologies, i.e., technologies, employed to manufacture the compensation circuits of the present disclosure may have been adopted from integrated circuit (IC) technology. For example, the structures may be built on wafers and may be realized in films of material patterned by photolithographic processes on the top of a wafer.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A structure comprising:

a first curvature compensation circuit comprising a first set of transistors; and a second curvature compensation circuit comprising a second set of transistors, wherein a voltage reference (VREF) signal output from a bandgap voltage reference core with the second curvature compensation circuit is received as an input to the first curvature compensation circuit, and the first set of transistors are fully depleted semiconductor on insulator (FDSOI) PMOS transistors with back gates connected to the VREF signal.

2. The structure of claim 1, wherein the first curvature compensation circuit injects a temperate dependent current into a node of a bandgap voltage reference with the second curvature compensation circuit to compensate a current increase with temperature in the second set of transistors of the bandgap voltage reference core with the second curvature compensation circuit.

3. The structure of claim 1, wherein the first set of transistors in the first curvature compensation circuit operate in a sub-threshold region.

4. The structure of claim 1, wherein the second set of transistors are fully depleted semiconductor on insulator (FDSOI) NMOS transistors.

5. The structure of claim 1, further comprising a selector which selects active FDSOI PMOS transistors of the first curvature compensation circuit.

6. The structure of claim 5, wherein the active FDSOI PMOS transistors of the first curvature compensation circuit are set by an input vector determined by an initial trim process.

7. The structure of claim 1, wherein an injected temperature dependent current is decreased in response to an increase in the VREF signal output from the bandgap voltage reference core with the second curvature compensation circuit.

8. The structure of claim 1, wherein a voltage value of the VREF signal, which is fed back to the first curvature compensation circuit, is determined by an input vector which defines a tap of a tapped resistor.

9. The structure of claim 8, wherein the tapped resistor connects to back gates of the second set of transistors, and the input vector is determined by an initial trim process.

10. The structure of claim 1, wherein the first compensation circuit operates as a start-up circuit during a voltage reference power up.

11. A structure comprising:

a first curvature compensation circuit comprising a first set of transistors; and a second curvature compensation circuit comprising a second set of transistors, wherein a voltage reference (VREF) signal output from a bandgap voltage reference core with the second curvature compensation circuit is received as an input to the first curvature compensation circuit, and the second set of transistors are fully depleted semiconductor on insulator (FDSOI) transistors operating in a sub-threshold region.

12. The structure of claim 1, wherein the second curvature compensation circuit compensates a current increase in the second set of transistors in response to a temperature increase.

13. The structure of claim 1, wherein, in response to an increase in the VREF signal connected to back gates of the second set of transistors, a threshold voltage of the second set of transistors is increased.

14. The structure of claim 13, wherein, in response to the increase of the threshold voltage of the second set of transistors, a current increase of the second set of transistors is decreased which occurs with rising temperature.

15. A circuit comprising:

a first set of transistors which operate in a sub-threshold region and which are connected to a voltage reference (VREF) signal;

a second set of transistors which operate in the sub-threshold region and which are connected to the voltage reference (VREF) signal that is output from the second set of transistors;

a selector which selects a number of active transistors from the first set of transistors; and a tapped resistor which selects a portion of the VREF signal fed back to a back gate of the first set of transistors and the second set of transistors of curvature compensation circuits.

16. The circuit of claim 15, wherein the selector is set by a first input vector which is determined by an initial trim process.

17. The circuit of claim 15, wherein the first set of transistors and the second set of transistors are FDSOI PMOS transistors.

18. The structure of claim 15, wherein the first set of transistors operate as a start-up circuit during a voltage reference power up.

19. The structure of claim 15, wherein the VREF signal output from the second set of transistors is fed back to the first set of transistors.

* * * * *